(12) United States Patent
Jackson et al.

(10) Patent No.: US 7,931,367 B2
(45) Date of Patent: *Apr. 26, 2011

(54) EYEWEAR WITH REMOVABLE AUDIO SYSTEM

(75) Inventors: Michael T. Jackson, Boulder, CO (US); Eleanor Wink Jackson, Boulder, CO (US)

(73) Assignee: Zeal Optics, Inc., Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/766,899

(22) Filed: Apr. 25, 2010

(65) Prior Publication Data

US 2010/0201938 A1   Aug. 12, 2010

Related U.S. Application Data

(63) Continuation of application No. 11/625,234, filed on Jan. 19, 2007, now Pat. No. 7,784,935.

(60) Provisional application No. 60/760,429, filed on Jan. 20, 2006.

(51) Int. Cl.
    *G02C 3/00*   (2006.01)
    *G02C 5/14*   (2006.01)
    *G02C 5/00*   (2006.01)

(52) U.S. Cl. ............................ 351/158; 351/121; 351/41

(58) Field of Classification Search .................... 351/41, 351/111, 121, 158, 200–246; 381/309, 310, 381/327, 330, 381
    See application file for complete search history.

(56) References Cited

U.S. PATENT DOCUMENTS

| 5,387,949 | A | 2/1995 | Tackles | 351/121 |
| 6,729,726 | B2 | 5/2004 | Miller et al. | 351/158 |
| 6,769,767 | B2 | 8/2004 | Swab et al. | 351/158 |
| 6,929,365 | B2 * | 8/2005 | Swab et al. | 351/153 |
| 7,004,582 | B2 | 2/2006 | Jannard et al. | 351/158 |
| 7,013,009 | B2 * | 3/2006 | Warren | 379/420.01 |
| 7,231,038 | B2 | 6/2007 | Warren | 379/420.01 |
| 7,581,833 | B2 * | 9/2009 | Howell et al. | 351/121 |
| 2005/0159182 | A1 | 7/2005 | Lai | |

* cited by examiner

*Primary Examiner* — Mohammed Hasan
(74) *Attorney, Agent, or Firm* — Holme Roberts & Owen LLP

(57) ABSTRACT

Eyewear includes a left temple and a right temple. Each of the temples has a cavity sized to receive an audio device such as a BlueTooth transceiver configured to communicate wirelessly with a remote device like a cell phone or a digital sound device. The BlueTooth transceiver may be placed in the cavity of either temple with the other temple cavity covered with a cover plate. An earphone may be connected to the BlueTooth transceiver through a receptacle. The earphone delivers the audible sound to the user's ear. The receptacle of the BlueTooth transceiver to which the earphone connects is also configured to receive the connector from a charger to charge a rechargeable battery in the BlueTooth transceiver. The eyewear may also be configured with cover plates over the cavity in both of the temples or with an audio device in both cavities to provide audible signals to both ears of the user.

19 Claims, 11 Drawing Sheets

US 7,931,367 B2

EYEWEAR WITH REMOVABLE AUDIO SYSTEM

RELATED U.S. APPLICATION DATA

The present application is a continuation of U.S. patent application Ser. No. 11/625,234 filed on Jan. 19, 2007 Now U.S. Pat. No. 7,784,935 B2 that is currently pending, which, in turn, claims priority from and the benefit of U.S. Provisional Patent Application No. 60/760,429 filed on Jan. 20, 2006, each of which being incorporated in their entirety by this reference for all purposes.

BACKGROUND OF THE INVENTION

1. The Field of the Invention

This invention relates to eyewear with audio devices in the temples or stems and more particularly to eyewear with temples or stems configured to removably receive an audio system.

2. The Relevant Technology

Eyewear configured to include audio devices are known. For example, U.S. Patent Application 2005/0159182 (Lai) discloses eyewear with a wireless communication device in the temples. U.S. Pat. No. 6,769,767 (Swab, et al) discloses eyewear with a transceiver in the temples which may connect to a remote device. U.S. Pat. No. 6,929,365 (Swab, et al) also disclosed a wireless or BlueTooth system in the temples of eyewear. U.S. Pat. No. 6,729,726(Miller et al.) disclosed a temple structure to place an ear piece proximate the ear canal of the user. The ear piece is connected to a wireless transmitter to obtain aural or audible communications.

Eyewear with sound systems are commercially available including the NU Dare Shadow MP3 Sunglass and the THUMP 2™ eyeglass from Oakley.

BRIEF SUMMARY OF THE INVENTION

Eyewear for positioning about the head of a user has a lens frame for positioning proximate the eyes of a user. The lens frame includes at least one lens for positioning proximate the eyes of a user. A first temple is attached to the left side of the lens frame and sized to extend over an ear of the user. The first temple is formed to have a first cavity therein sized to removably receive therein one of an audio system and a cover plate.

A second temple is attached to the lens frame and sized to extend over the other ear of the user. Preferably the right temple is formed to have a right cavity therein sized to removably receive therein one of an audio system and a cover plate.

The audio system for generating audible sound for the user includes battery means for generating electrical power. The audio means is a circuit configured for producing audio signals convertible to audible signals. The audio means is connected to the battery means to receive power therefrom.

The audio system also includes connector means connected to receive the audio signals from the audio system. Audio transmitting means preferably in the form of an earphone is removably connected to the connector means to receive audio signals from the audio system. Upon removal of the earphone, a battery charger may be connected to the connector for removable connection to a battery charger for supplying power and recharge the battery means.

In preferred arrangements, the audio system includes a microphone for receiving audible signals from a user and converting the audible signals into outgoing audio signal for transmission to a remote device. The remote device may also transmit to the audio system.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
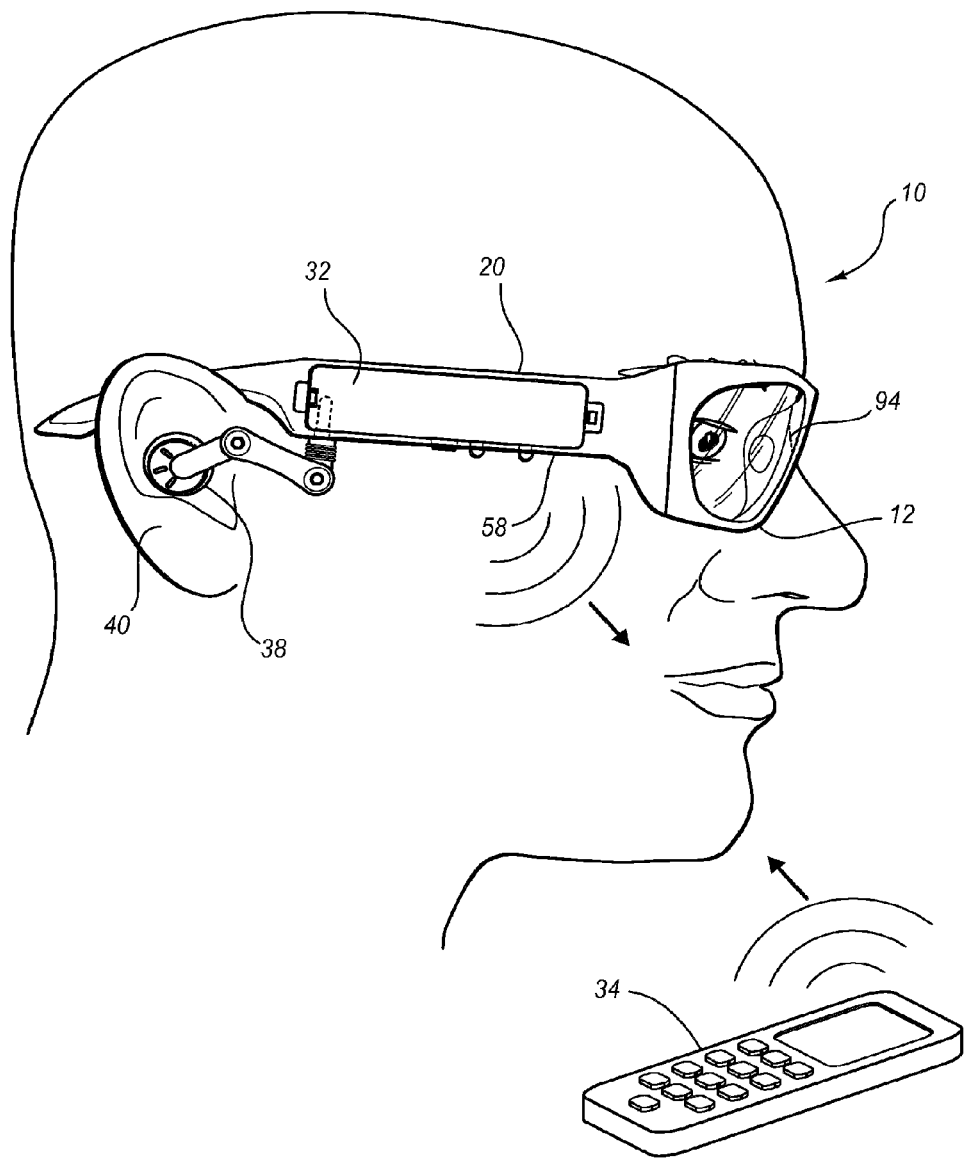
FIG. 1 is a simplified depiction of eyewear with an audio system configured to receive audio signals from a remote transmitting device of the instant invention.
Figure 2:
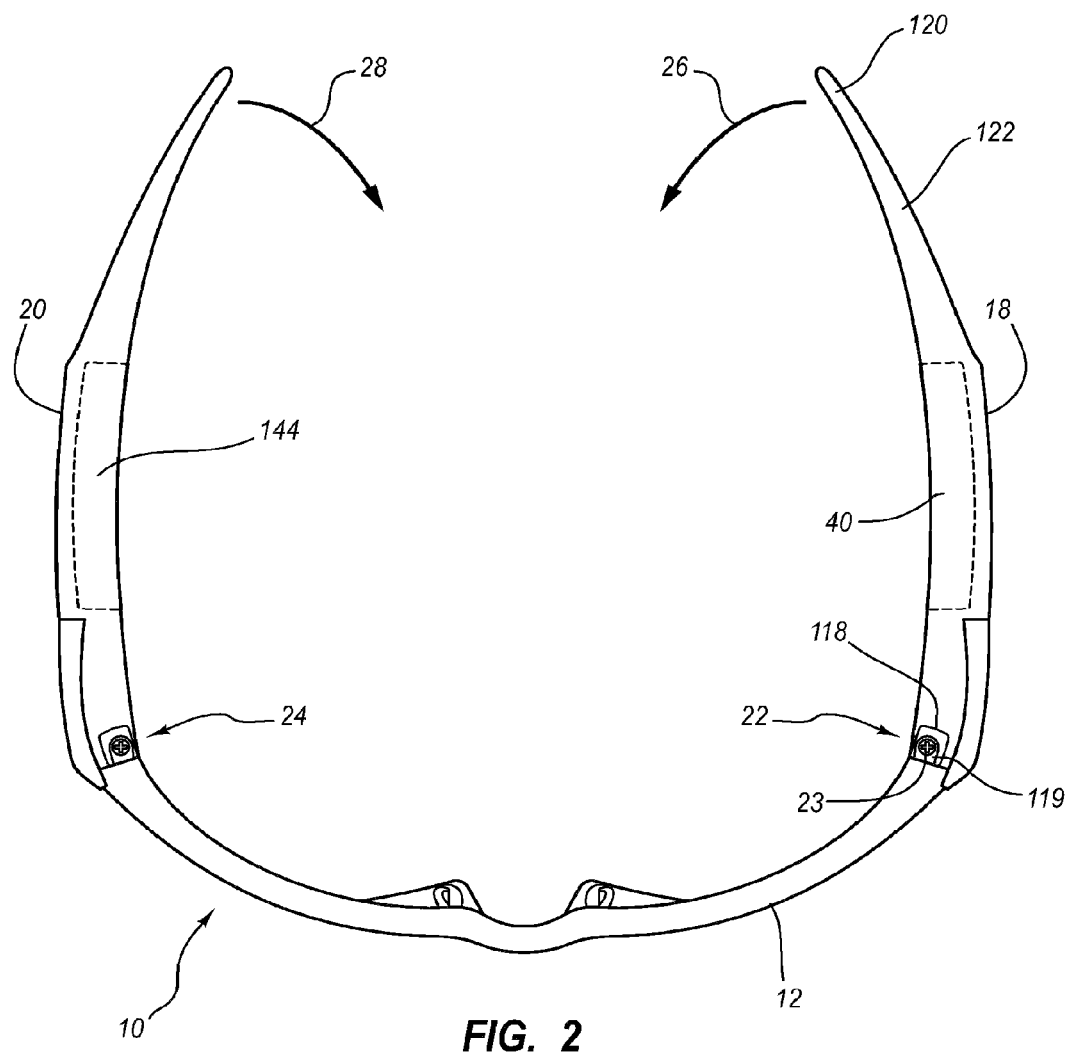
FIG. 2 is a top view of eyewear of the instant invention.
Figure 3:
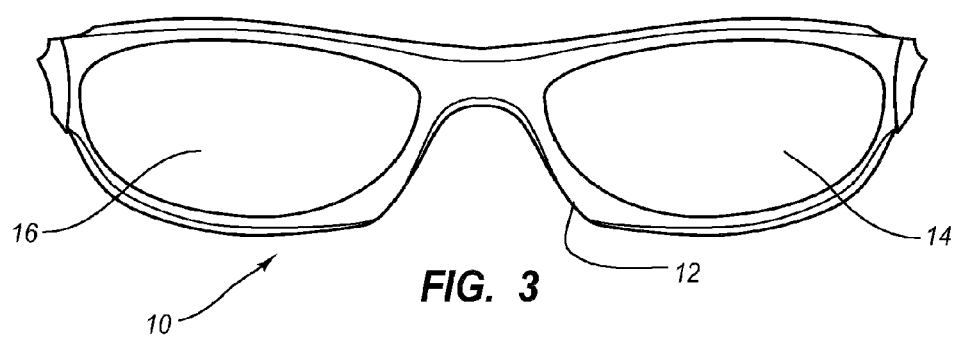
FIG. 3 is a front view of eyewear of the instant invention.

Referring to FIGS. 1, 2 and 3, eyewear 10 includes a front frame, nose frame or glass frame 12 configured to position 14 lenses and 16 proximate the eyes of an user in a traditional manner. The lenses 14 and 16 may be standard clear lenses, sunglass lenses or the like. The glass frame 12 is supported by a left temple 18 and a right temple 20. The temples 18 and 20 may also be referred to as "ears" and "stems." The left temple 18 and the right temple 20 are secured to the glass frame 12 by hinges 22 and 24 so the user may fold the left temple 18 and right temple 20 inwardly 26 and 28 when the eyewear 10 is not in use.

Figure 8:
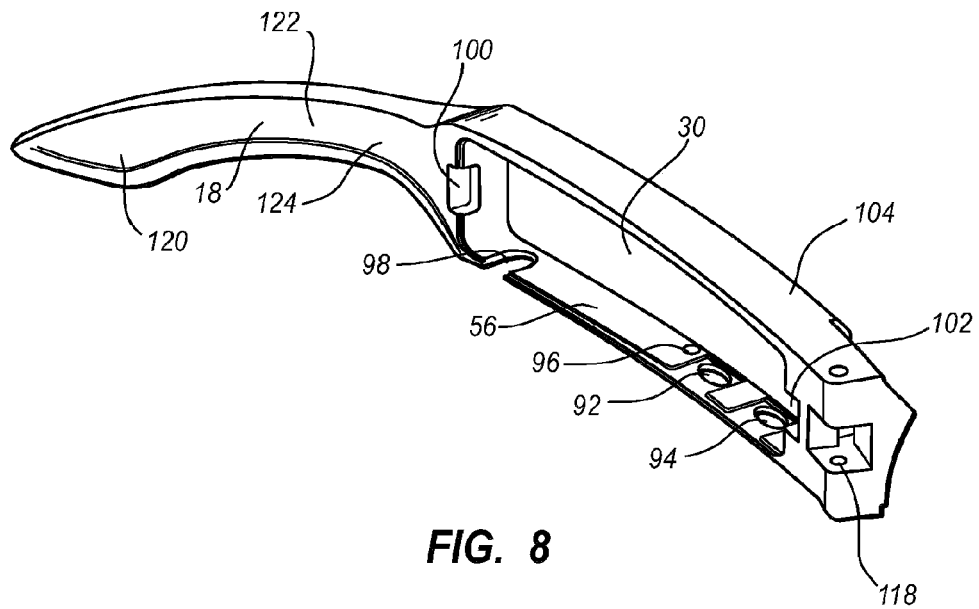
FIG. 8 is a front perspective of the left temple of FIG. 6.
Figure 9:
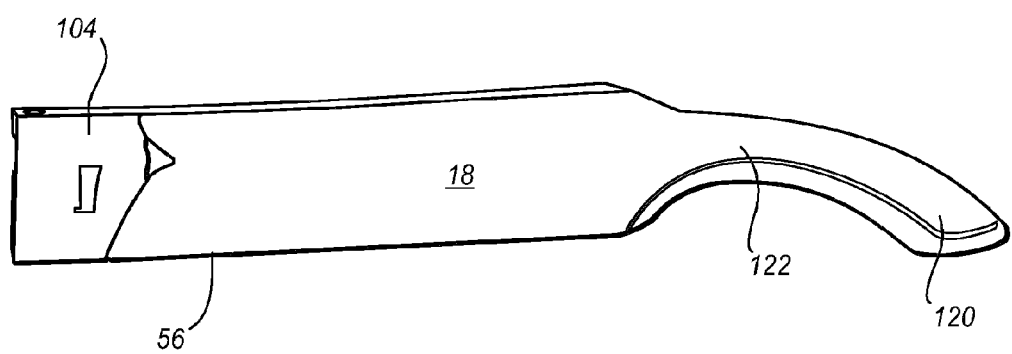
FIG. 9 is a perspective side view looking inwardly of a left temple of the temple of FIG. 6.
Figure 10:
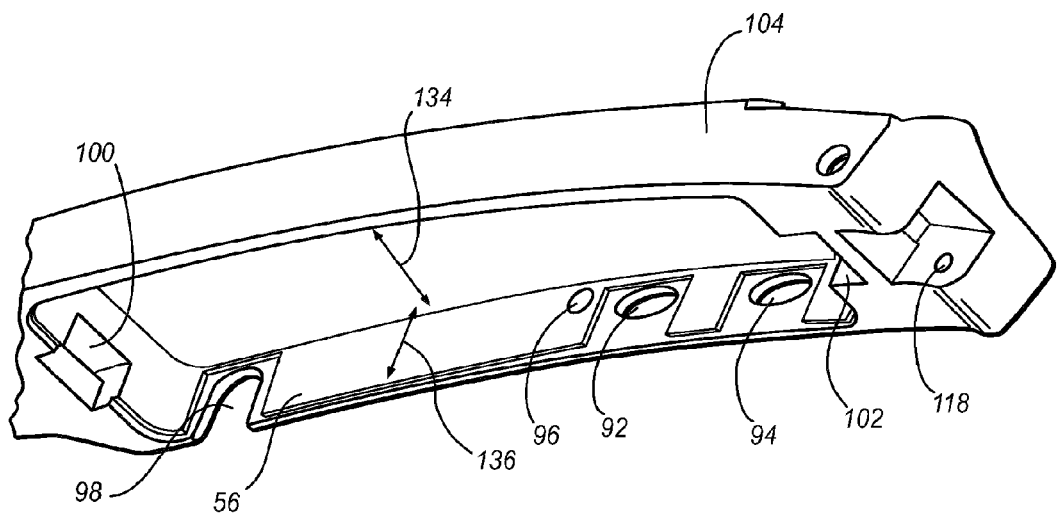
FIG. 10 is a top perspective view of the cavity in the left temple of FIG. 6.
Figure 11:
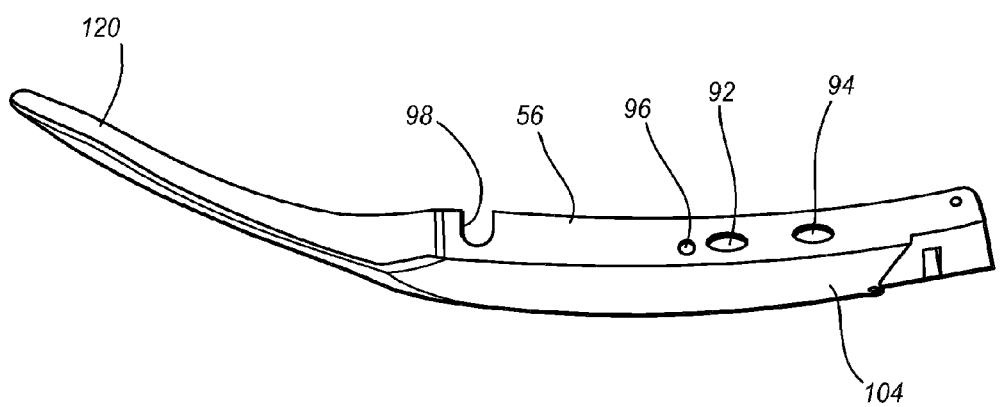
FIG. 11 is a bottom perspective view of the left temple of FIG. 6.
Figure 12:
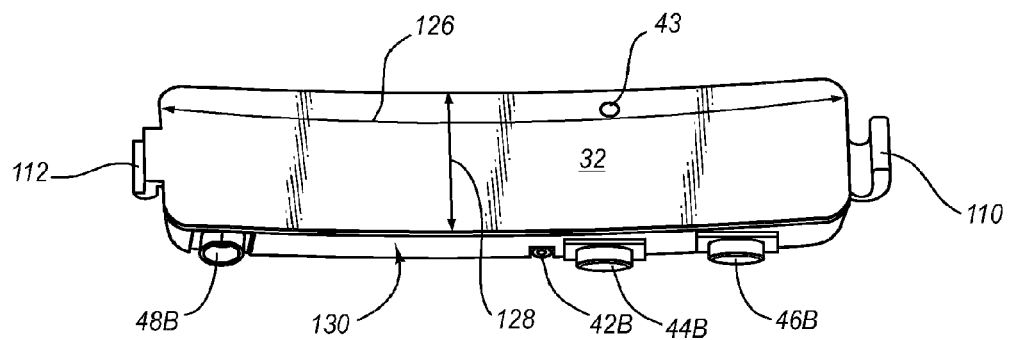
FIG. 12 is the inside view of an audio system configured for positioning in the cavity in the left temple of FIG. 6.
Figure 13:
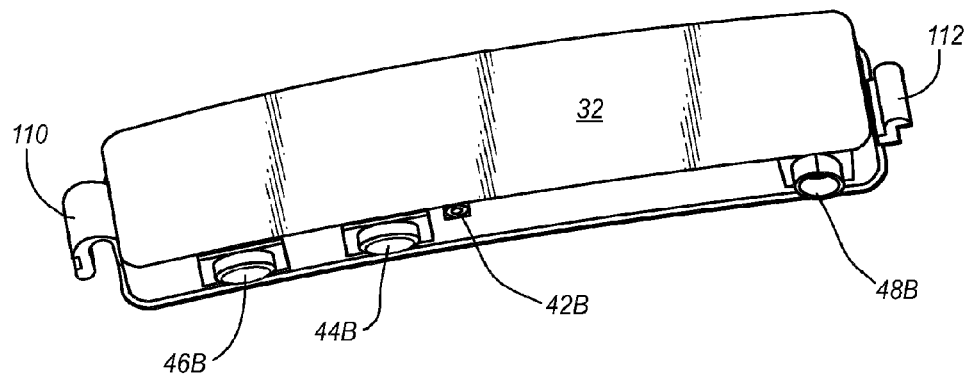
FIG. 13 is a perspective view of the outside surface of an audio system configured for positioning in the cavity in the left temple of FIG. 6.
Figure 14:
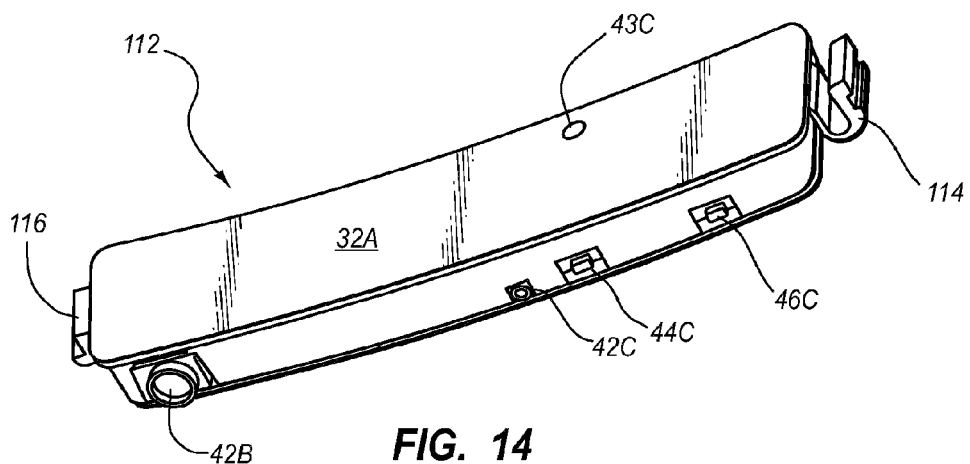
FIG. 14 is a bottom perspective view of an audio system configured for positioning in the cavity in the right temple of FIG. 6.

A pocket or cavity 30 (better seen in FIGS. 6, 8 and 10) is formed in at least one temple such as the left temple 18. The pocket or cavity 30 is sized to removably receive and retain audio means for use in an audio system. The audio means is any suitable device capable of producing or configured to produce audio signals that can be converted to audible signals for the user. Thus, the audio means may be a radio (AM/FM), a two-way radio, a telephone, the audio signal from a CD player or a DVD player, an electronic digital sound device like an MP3 player and a cell phone. It may also be a wireless device such as a BlueTooth device 32 or 32A (e.g., see FIGS. 4, 5 and 12-14) connected to receive audio signals wirelessly from and, for some devices such as a cell phone, to transmit audio signals to a remote source such as a cell phone 34 (FIG. 1) or other suitable device that generates audio signals.

It should be understood that the audio means is part of an audio system that may include an ear piece 36 to convert audio signals received electrically or electronically from the audio means such as the BlueTooth device 32 and convert them in audible signals or sound for the user to hear through a small speaker 38 positioned proximate and preferably directly over the ear canal of the user's ear 40. The speaker is any suitable device configured to convert electronic or electrical signals to audible sound.

The audio system also may include a microphone 42, 42A, 42B and 42C (FIGS. 4, 5, 12-14) along with up volume control 44, 44A, 44B and 44C as well as a down volume control and on-off switch 46, 46A, 46B and 46C. That is, the down volume control 46A, 46B and 46C is configured to lower the volume when pressed and when held for a period (e.g., 1-2 seconds), it will turn off the audio means, which is here the BlueTooth device 32. The audio means, such as BlueTooth device 32 or 32A, is battery powered typically by one or more small rechargeable batteries which are included with and changeable in the BlueTooth device 32 or 32A. The BlueTooth device 32 or 32A may also be configured with a sensor positioned internally which measures the time from the last audio signal generated by or through the microphone 42, 42A, 42B and 42C as well as the last audio signal received from the remote source 34. After a pre-selected period (e.g., 15 seconds up to 1 minute), the sensor automatically turns off the BlueTooth device 32 to conserve battery power. In some units, a small warning beep may be generated as an audio signal and converted to an audio signal by the earphone 38 to warn the user that the BlueTooth device 32 or 32A will be turning off again in a pre-selected time of, for example, 5 seconds, so the user can do something to avoid automatic turn off. A light emitting diode (LED) 43 and 43C is shown positioned to emit light when the BlueTooth device 32 or 32A is on so the user can detect the on condition when removing the eyewear 10 and placing them on a nearby adjoining surface (e.g., table).

It may be noted that the microphone 42, 42A, 42B and 42C (FIGS. 4, 5, 12-14) is located forwardly of the ear 40 proximate the upper jaw area to facilitate the transmission of sound from the mouth to the microphone 42, 42A, 42B and 42C. Notably the up volume control 44, 44A, 44B and 44C as well as a down volume control and on-off switch 46, 46A, 46B and 46C are also conveniently positioned between the ear 40 of the user and the hinge 22 or 24 to again be convenient for the user to access and operate.

The BlueTooth device 32 illustrated has an aperture 48, 48A, 48B and 48C configured to receive a connector 50 of the earpiece 36. The connector 50 (FIG. 17) is a conductor with a length 54 sized to position the connector 50 snugly in the aperture 48, 48A, 48B and 48C with the shoulder 54 substantially abutting the lower exterior surface 56 of the left temple 18 or the lower exterior surface 20 of the right temple 20. The connector 50 has a shoulder 60 with separate conductors 61, 62 and 64. The tip is a positive electrical connection 66 that is arranged with a separate conductor, such as conductor 62, to effect an electrical connection for purposes of supply electrical power to the Blue Tooth device 32 or 32A. The tip 62 extends rearward another separate leg or ground 68. The insulators are sized to lead to a very snug fit into an aperture 48, 48A, 48B and 48C and in turn retain the earpiece 36 in connection with the temples 18 or 20.

Figure 5:
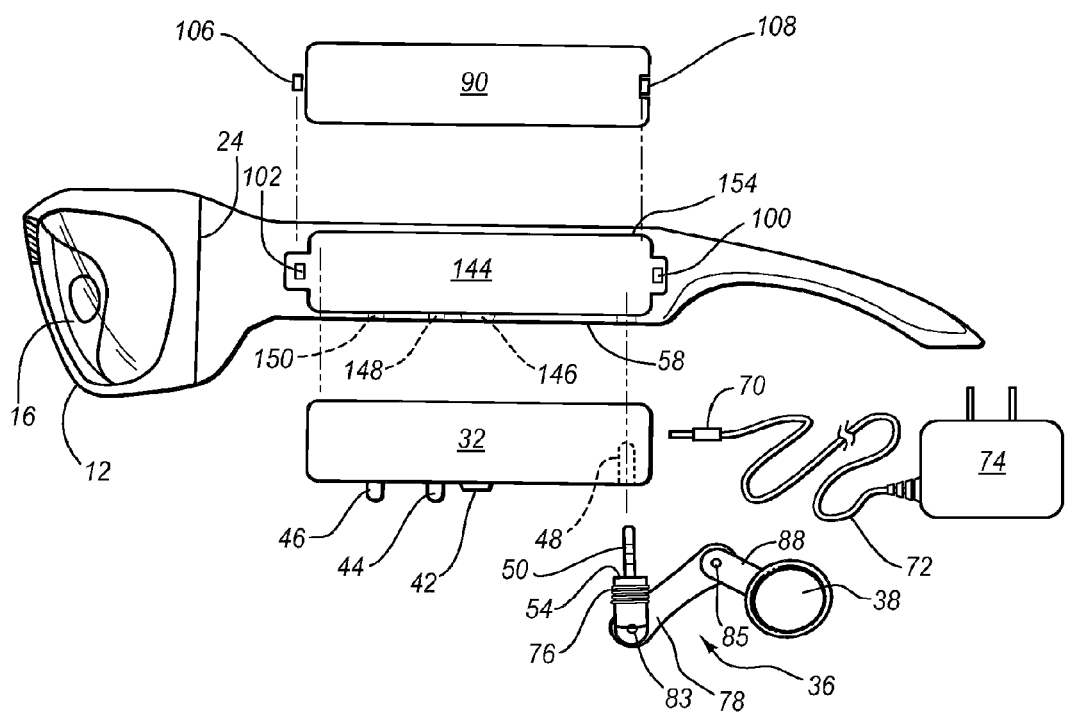
FIG. 5 is a side view of a right temple of eyewear of the instant invention along with an audio system and a cover plate.
Figure 6:
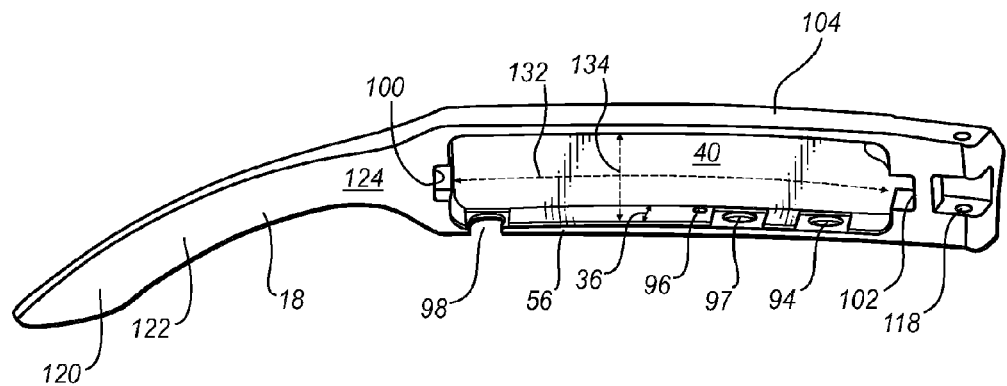
FIG. 6 is a perspective side view looking from inside outwardly of a left temple of the eyewear of the instant invention.
Figure 7:
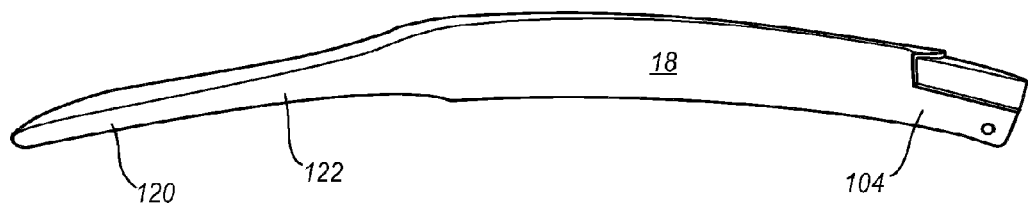
FIG. 7 is top perspective view of the left temple of FIG. 6.

The apertures 48, 48A, 48B and 48C are also configured to snugly receive a connector 70, as illustrated in FIG. 5. The connector 70 is connected by a two wire conductor 72 to a transformer 74 which is configured to provide power, e.g., from a 115 volt source, reduced to a desired voltage, such as 6 volts to appropriately charge the internal rechargeable battery (not shown). The connector 70 is also configured to provide a positive and a ground connection.

Figure 4:
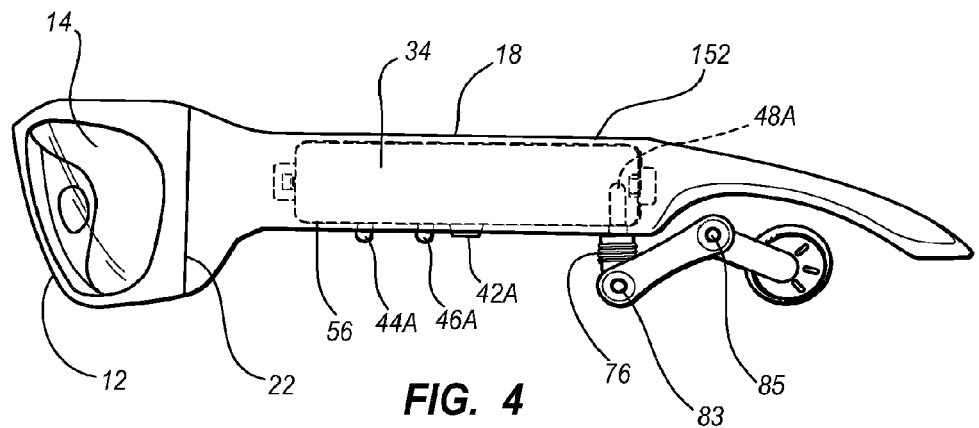
FIG. 4 is a side view of a left temple of eyewear of the instant invention.
Figure 17:
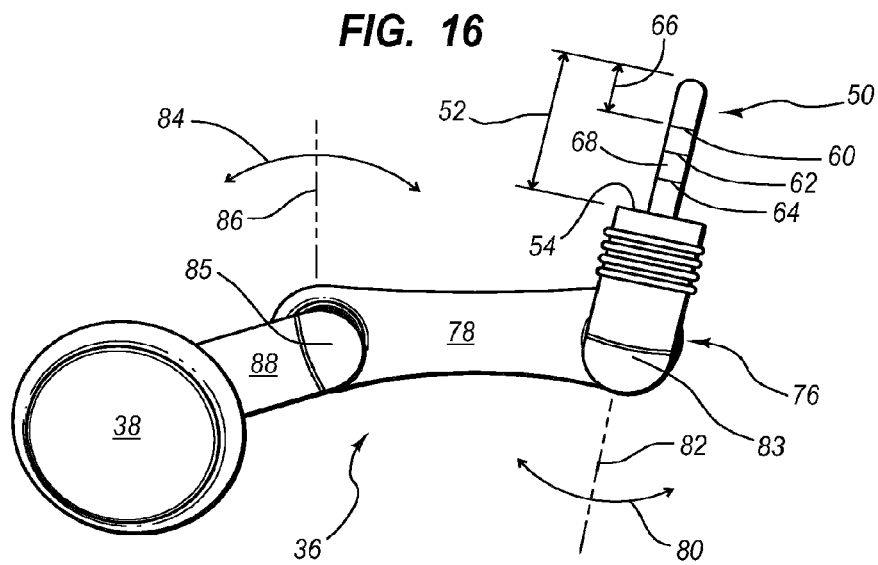
FIG. 17 is an enlarged image of an ear phone for use with the left temple of FIG. 6.

The earpiece 36 shown in FIGS. 4, 5, and 17 has the connector 50 that extends from a housing 76 to which a first arm 78 is pivotally connected to rotate 80 about axis 82 on a first axle 83. The first arm 78 is pivotally connected to rotate 84 on axle 85 about axis 86 with the second arm 88. A two wire connection is effected from the housing 76 to and through the first arm 78 and the second arm 88 through their respective axles 83 and 85 all in a conventional manner to connect the earphone or speaker 38 so that audio signals can be converted to audible signals.

Referring to FIGS. 17, 18, 19 and 20, a representative connector 160 is shown in cross section which can be used as connector 50 or 70. Similarly, receptacle 162 is shown sized to receive the connector 160. The receptacle 162 may be used as one of the apertures 48, 48A, 48B and 48C. The connectors 50 and 70 may be constructed in alternate ways so that connector 50 can effect a connection for audio signals and connector 70 can be used to connect a charger to the BlueTooth device and its included battery. The configurations shown in FIGS. 18. and 19 are preferred as the same connector 160 or connector 164 may be used for both the audio connection 50 and the batter charger connection 70.

Figure 18:
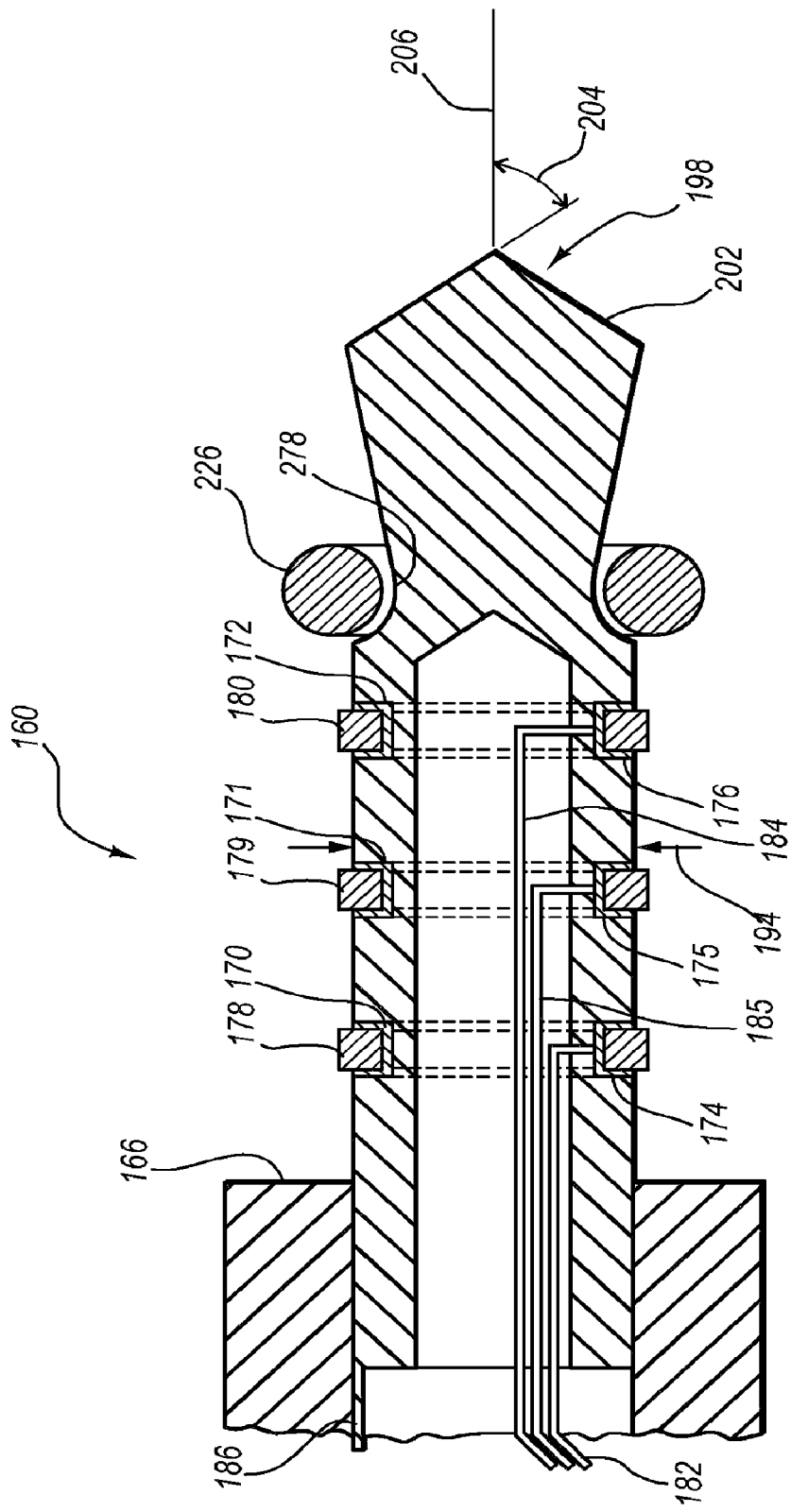
FIG. 18 is an enlarged cross sectional view of a plug or connector for use with an ear phone of FIG. 6 or a charger for use with the instant invention.

As seen in FIG. 18, the connector 160 has a base 166 into which a finger 168 is mounted. The base 166 may be affixed to the finger 168, typically by use of conventional potting techniques. However, the base 166 may be affixed to the finger 168 by glue, screws, or any other suitable means to effect a firm physical association. The finger 168 is made of a suitable conductive metal (e.g., various iron alloys) with three grooves 170, 171, 172 formed in the finger 168 to extend around the circumference of the finger 168. Each groove 170-172 has an insulator 174, 175, and 176 positioned therein which may be a thin film mylar or even paper to insulate conductive rings 178, 179, and 180. The conductive rings 178-180 may be made from a suitable commercially available composition of carbon or graphite and resin. The conductive rings 178-180 are each connected to conductors (wires) 182, 183, and 184 for further connection. A separate conductor 186 is affixed to the finger 168 itself.

In use, the connector 160 is used to attach the ear piece 36 to the Blue Tooth device 32, 32A by inserting it into the receptacle 162. The receptacle 162 has a tubular and preferably cylindrical opening 190 sized in diameter 192 slightly larger than the diameter 194 of the finger 168 and sized in length so that the base 166 abuts the exterior surface 196 at the same time that the tip 198 contacts the inside recess 200 of the cylindrical opening 190. That is, the finger 168 has a front section 202 that is tapered outwardly at a suitable angle 204 from the axis 206 to mate or register with a suitable or comparable surface 208 at an angle 210 comparable to angle 204 relative to axis 212 so that when the connector 160 is inserted in the cylindrical opening 190, the axis 206 is coaxial and in general alignment with axis 212. When inserted, it can be seen that the conductive rings 178-180 align with corresponding conductive rings 214, 215, and 216. Conductive rings 214, 215, and 216 may be mounted to be electrically insulated as needed so that electrical signals may pass between conductive rings 178-180 and conductive rings 214-216 respectively. That is, the conductive rings 178-180 are in electrical contact with conductive rings 214-216 when the finger 168 is fully inserted into cylindrical opening 190

As can be seen, the front section 202 of the finger 168 connects to the font portion 220 of the cylindrical opening 190 to effect an electrical connection by conductor 222 to the battery (not shown); and the middle ring 215 connects by conductor 224 to the battery. Thus a positive and negative connection is effected so that the battery may be charged through the transformer 74, conductor 72 and connector 70 which has a finger and base comparable to finger 168 and base 164. Thus conductors 183 and 186 are extended into conductor 172 for connection to the transformer 74. It should also be noted that the finger 168 has an opening and, preferably, a cylindrical opening formed by drilling into the finger to provide a passage way for conductors 182, 183, 184, and 186.

The cylindrical opening 190 has an o-ring 226 or similar compressible ring that could be made out of Teflon or nylon or other suitable material that is elastically deformable to compress as the front section 202 of the finger 168 is urged into the opening 190. The o-ring 226 abuts the shoulder 228 of the finger 168 to snugly hold the finger 168 in place after it is inserted into the opening 190.

The connector 160 may be used with the earphone 36 by connecting conductors 182 and 184 to the speaker 38. Of course the conductors 182 and 184 are connected to conductive rings 174 and 176 for further connection to rings 214 and 216 which connect to circuits in the Blue Tooth Unit 32 and 32A to receive audio signals and transmit them to the speaker 38.

Figure 19:
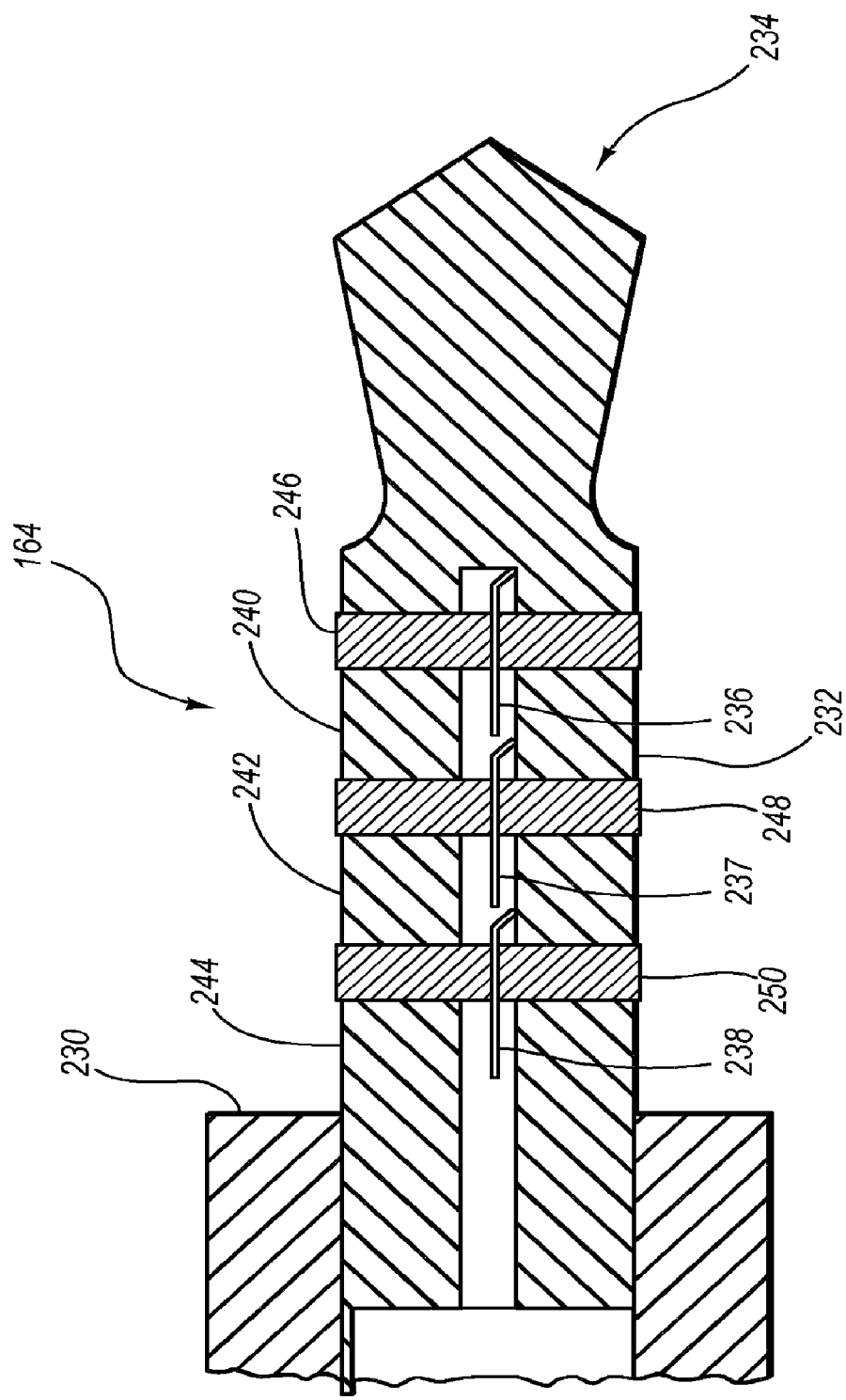
FIG. 19 is an enlarged cross sectional view of an alternate plug or connector for use with an ear phone of FIG. 6 or a charger for use with the instant invention.
Figure 20:
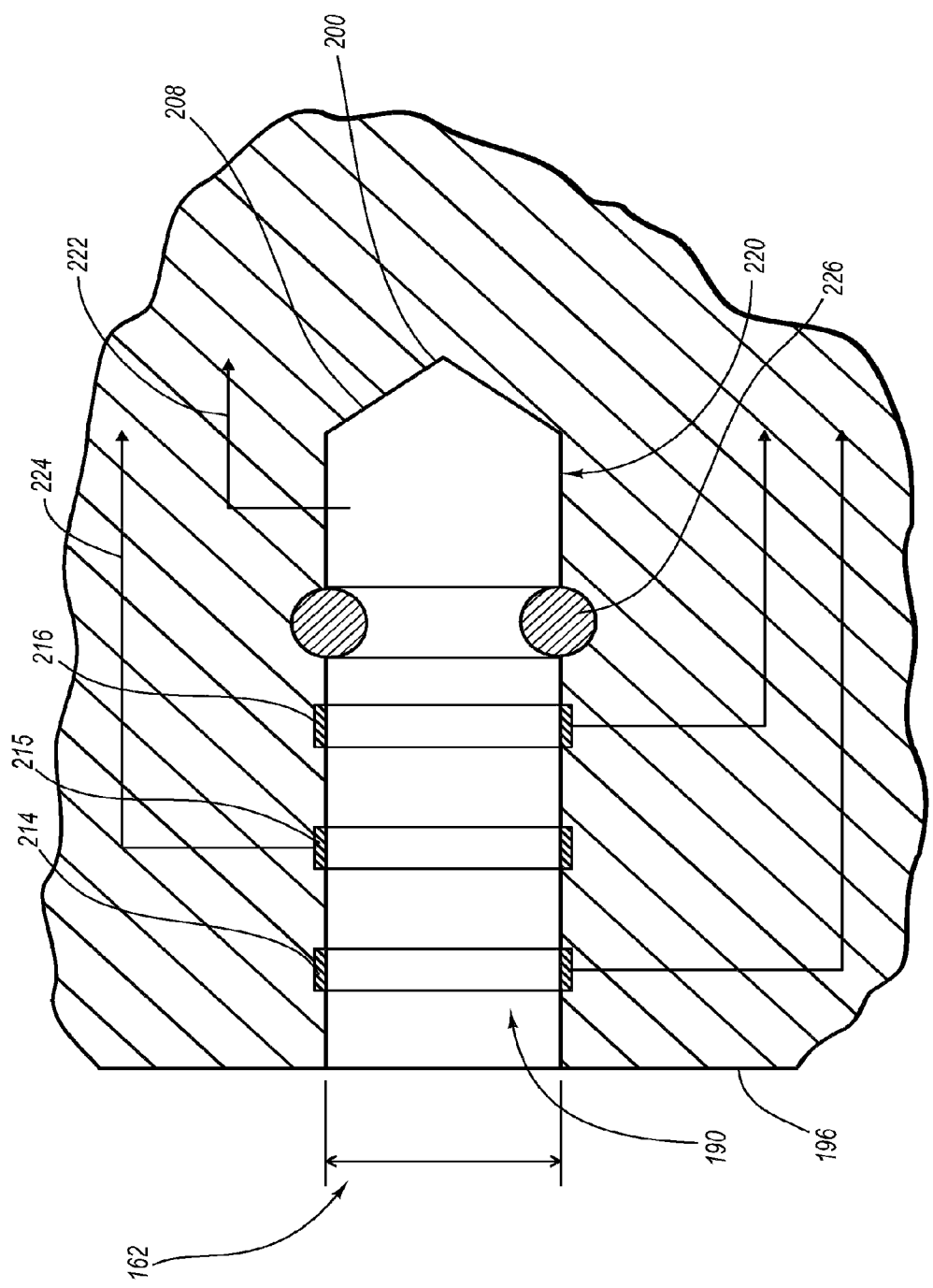
FIG. 20 is an enlarged cross sectional view of a receptacle for use with an audio system of the instant invention configured to receive the plug or connector of FIG. 18 or 19.

FIG. 19 depicts an alternate connector 164 which has a base 230 and a finger 232. The front section 234 is comparable in shape and size to that of front section 202 of connector 160. The finger 232 has an opening bored into it to allow conductors 236, 237, and 238 to extend through into the base 230. The conductors 236, 237, and 238 are each connected (as by soldering) to a section of the finger 232 such as the front section 234, the forward section 240, middle section 242, and rear section 244. The forward section 240 is insulated from the front section 234 by insulator 246. Similarly, the forward section 240 is insulated from the middle section 242 by insulator 248; and the middle section 242 is insulted from the rear section 244 by insulator 250. The conductive rings 214-216 in the opening 190 are repositioned to conduct the forward section 240, the middle section 242, and the rear section 244. Thus the front section 234 and the middle section 242 can be used to communicate electricity to the battery of the Blue Tooth unit 32 and 32 A. The forward section 240 and the rear section 244 can be used to communicate audio signals to the speaker 38. It can also be seen that the finger 232 is sized and shaped comparable to finger 168 so that finger 232 mechanically registers with the opening 190.

Turning now to FIGS. 7-11, the left temple 18 is shown in perspective from a number of views. The left temple 18 has the cavity 30 formed in it sized to snugly receive the BlueTooth device 32 or to receive a cover plate (FIG. 5). The cavity 30 is formed with apertures 92 and 94 extending through the lower surface 56 to receive the up and down on/off buttons. An optional aperture 96 is formed or formable to register with a microphone of the BlueTooth device 32 or 32A. A slot or aperture 98 is also formed to register with a suitable receptacle or aperture 48, 48A, 48B and 48C so the earpiece 36 may be connected to the BlueTooth device 32. At opposite ends of the cavity 30 are slots 100 and 102. The slots 100 and 102 are sized to frictionally engage ears or tabs 106 and 108 of the cover plate 90 as well as the tabs 110, 112, 114, and 116 of the audio means such as BlueTooth device 32 or 32A.

At the front end 104 of the left earpiece 18 is a separate cavity 118 sized to register with a suitable tab 119 of the glass frame 12 to form the left hinge 22 with hinge pin 23. At the rear end 120 is an ear portion 122 shaped to engage the ears of the user when the eyewear 10 is positioned about the head with the glass frame positioning the lenses 14 and 16 proximate the eyes of the user.

Figure 15:
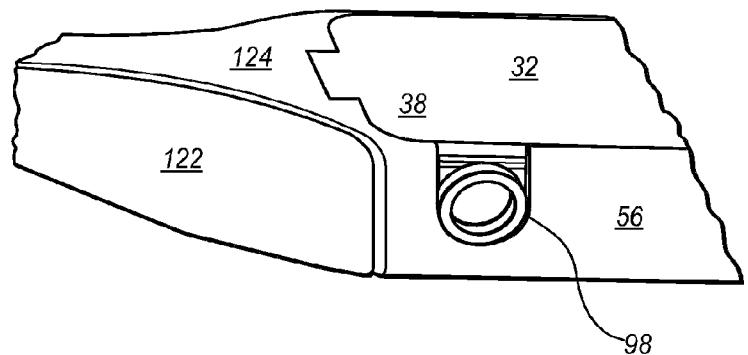
FIG. 15 is a bottom perspective view of an audio system positioned in the left temple of FIG. 6.
Figure 16:
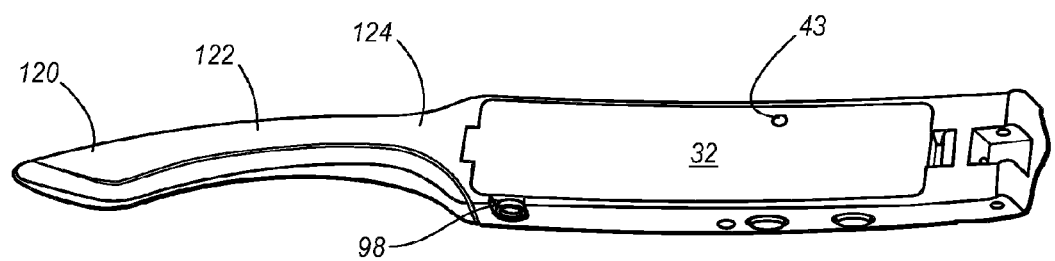
FIG. 16 is an enlarged view of a perspective of the left temple of FIG. 6 with a cover plate installed.

Referring to FIGS. 15 and 16, it can be seen that the audio means, such as BlueTooth device 32 or 32A, is sized to fit flush with the internal surface 124 of the left temple 128. That is, the BlueTooth device 32 has a width 126, a height 128 and a thickness 130 selected to be comparable to the width 132, the height 134, and depth 136 of the cavity 30 so as to effect a snug fit and a smooth inner surface. That is, the internal surface 124 of the left temple 18 is flush and smooth with the internal surface 38 of the BlueTooth device 32, as best seen in FIG. 16. With a snug and flush fit between the surface 138 and the surface 124, the user's hair is less likely to snag. Further, there will be no edges to press against the user to create an uncomfortable fit over time when the eyewear 10 is worn.

Of course, the cover plate 90 is similarly sized in height 140 and width 142 to effect a flush and snug fit in the cavity 30. If the user does not wish to use an audio means, it can be removed and the cavity 30 covered by the cover plate 90 thereby removing the weight of the BlueTooth device 30 or 32A, which some users may find preferable.

It should be noted that the relationship of the BlueTooth device 30 or 32A has been discussed in connection with the cavity 30 in the left temple 18. The right temple 20 is in effect a mirror image of the left temple 18. The right temple 20 thus has a similar cavity 144 which is sized virtually identical but as a mirror image of cavity 30. The cavity 144 in the right temple 20 can be formed with holes 150, 148 comparable to holes 92 and 94 of the left temple 18, and hole 146 comparable to hole 96, but positioned so that the same BlueTooth device 32 or 32A may fit in the cavity 144 of the right temple 20 in the same manner as it fits in the cavity 30 of the left temple 18.

In alternate embodiments, it should be understood that the apertures 92, 94, and 96 formed in the bottom exterior surface 56 of the left temple 18 or apertures 146, 148, and 150 formed in the exterior surface 58 of the right temple 20 may be formed in the upper surface 152 of the left temple 18 and the upper surface 154 respectively. That is, some users may find it more convenient or preferable to have operating buttons on the upper surfaces 152 and 154.

In use, it can be seen that the eyewear 10 can be used with a cover plate 90 in place over the cavity 30 in the left temple 18 and over the cavity 144 in the right temple 20. The user also may place an audio means such as the BlueTooth device 32 or 32A in one of the two cavities 30 and 144 based on his or her preference. The user may also place audio means in both the cavities 144 and 30 when the audio means are connected wirelessly to a common source to receive a left channel and a right channel of a stereo signal. Alternately, the user may have two separate BlueTooth devices 32 positioned one in each temple 18 and 20 so the user in effect may have two cell phones or two separate devices for generating audible signals (sound) for the user. Of course the user may convert between any one of the above mentioned configurations quickly as desired by simply snapping in and out as convenient.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. Eyewear for positioning about the head of a user, said eyewear comprising:
  a lens frame for positioning proximate the eyes of a user, said lens frame including at least one lens for positioning proximate the eyes of a user said lens frame having a right side and a left side;
  a left temple attached to said left side of said lens frame and sized to extend over the left ear of the user, said left temple being formed to have a left cavity therein sized to removably receive therein one of an audio system and a cover plate;
  a right temple attached to said right side of said lens frame and sized to extend over the right ear of the user, said right temple being formed to have a right cavity therein sized to removably receive therein one of an audio system and a cover plate;
  said audio system for generating audible sound for the user, including:
    battery means for generating electrical power;
    audio means configured for producing audio signals convertible to audible signals for said user, said audio means being connected to said battery means to receive power therefrom;
    connector means connected to said audio means to receive said audio signal therefrom and for removable connection to audio transmitting means for supplying said audio signals and said electrical power thereto and for removable connection to a battery charger for supplying power to said battery means;
    audio transmitting means for removable connection to said connector to receive said audio signal, said audio transmitting means configured to convert said audio signal to said audible signal proximate an ear of a user.

2. The eyewear of claim 1, wherein said audio system includes a microphone connected to said audio system, said microphone configured for receiving audible signals from a user and converting said audible signals into outgoing audio signals.

3. The eyewear of claim 1, further comprising at least one volume control connected to said audio means and configured to allow a user to adjust a volume of said audible signals.

4. The eyewear of claim 3, wherein said volume control comprises an up volume control to increase said volume of said audible signal and a down volume control to decrease said volume of said audible signal.

5. The eyewear of claim 1, wherein said audio means is configured to receive said audio signal wirelessly from a remote source.

6. The eyewear of claim 5, wherein said audio means is configure to transmit said audio signal wirelessly to a remote source.

7. The eyewear of claim 1, wherein said audio means further comprises at least one of a BlueTooth device, a radio, a two-way radio, a telephone, a CD player, a DVD player, an MP3 player and a cell phone.

8. The eyewear of claim 1, wherein said audio means further comprises an on-off switch connected to said audio means configured to allow said user to turn said audio means on and off.

9. The eyewear of claim 1, wherein said connector means includes an aperture to receive a connector of said audio transmitting means and another connector of said battery charger, said aperture being oriented substantially vertically.

10. Eyewear for positioning about the head of a user, said eyewear comprising:
  a lens frame for positioning proximate the eyes of a user, said lens frame including a at least one lens for positioning proximate the eyes of a user said lens frame having a right side and a left side;
  a first temple attached to one of said left side and said right side of said lens frame and sized to extend over an ear of the user, said first temple being formed to have a cavity therein sized to removably receive therein one of an audio system and a cover plate;
  a second temple attached to said lens frame and sized to extend over the other ear;
  said audio system for generating audible sound for the user, said audio system including:
    battery means for generating electrical power;
    audio means configured for producing audio signals convertible to audible signals for said user, said audio means being connected to said battery means to receive power therefrom;
    connector means connected to said audio means to receive said audio signals therefrom and for removable connection to audio transmitting means for supplying said audio signals and said electrical power thereto and for removable connection to a battery charger for supplying power to said battery means;
    audio transmitting means for removable connection to said connector to receive said audio signal, said audio transmitting means configured to convert said audio signal to said audible signal proximate an ear of a user.

11. The eyewear of claim 10, further comprising an on-off switch connected to said audio means configured to allow said user to turn said audio means on and off.

12. The eyewear of claim 10, wherein said audio system includes a microphone connected to said audio system, said microphone configured for receiving audible signals from said user and converting said audible signals into outgoing audio signals.

13. The eyewear of claim 10, wherein said audio system further comprises at least one volume control connected to said audio means and configured to allow a user to adjust a volume of said audible signals.

14. The eyewear of claim 13, wherein said volume control comprises an up volume control to increase said volume of said audible signal and a down volume control to decrease said volume of said audible signal.

15. The eyewear of claim 10, wherein said audio means is configured to receive said audio signal wirelessly from a remote source.

16. The eyewear of claim 15, wherein said audio means is configure to transmit said audio signal wirelessly to a remote source.

17. The eyewear of claim 10, wherein said second temple further comprises a cavity formed therein sized to removably receive one of an audio system and a cover plate.

18. The eyewear of claim 17, wherein said audio means further comprises at least one of a BlueTooth device, a radio, a two-way radio, a telephone, a CD player, a DVD player, an MP3 player and a cell phone.

19. The eyewear of claim 10, wherein said connector means includes an aperture to receive a connector of said audio transmitting means and another connector of said battery charger, said aperture being oriented substantially vertically.

* * * * *